United States Patent [19]
Smith, Jr.

[11] 3,892,128
[45] July 1, 1975

[54] METHODS FOR THERMAL WELL LOGGING

[75] Inventor: Harry Davis Smith, Jr., Houston, Tex.

[73] Assignee: Texaco Inc., New York, N.Y.

[22] Filed: Aug. 6, 1973

[21] Appl. No.: 385,773

Related U.S. Application Data

[63] Continuation-in-part of Ser. No. 272,266, July 17, 1972, Pat. No. 3,807,227.

[52] U.S. Cl. .................................................. 73/154
[51] Int. Cl. ........................................... E21b 47/06
[58] Field of Search .............................. 73/154, 340

[56] References Cited
UNITED STATES PATENTS

| | | | |
|---|---|---|---|
| 2,311,757 | 2/1943 | Jakosky | 73/154 |
| 2,352,247 | 6/1944 | Blau et al. | 73/154 |
| 3,668,927 | 6/1972 | Howell et al. | 73/154 |

*Primary Examiner*—Jerry W. Myracle
*Attorney, Agent, or Firm*—T. H. Whaley; C. G. Ries; William J. Beard

[57] ABSTRACT

A method for thermal well logging of earth formations in cased or open boreholes to produce logs of temperature, specific heat and formation thermal conductivity is disclosed. A well logging tool employing a constant output heat source and three temperature sensors is utilized. A first temperature sensor measures the ambient borehole temperature at a given depth level. The constant output heat source then heats the formation at the investigated depth level. A second temperature sensor located relatively near the heat source then measures the temperature increase at the depth level due to the heating. This provides a measure of the formation specific heat. A third temperature sensor located a spatially separated distance from the second temperature sensor is then moved past the depth level being investigated some time interval later and the amount of cooling since the heat source has passed is measured. This provides a measure of the formation thermal conductivity. A further embodiment which utilizes the three temperature sensors and a heat source which is utilized also as a drilling tip is also disclosed.

6 Claims, 2 Drawing Figures

3,892,128

METHODS FOR THERMAL WELL LOGGING

This application is a Continuation-in-Part of copending application Ser. No. 272,266, filed July 17, 1972, now Pat. No. 3,807,227.

BACKGROUND OF THE INVENTION

This invention relates to well logging and more specifically to methods of thermal well logging to determine the specific heat, thermal conductivity, and geothermal gradient present in boreholes.

In cased well bores there are relatively few physical measurements which may be made through the casing to determine physical properties of formations behind the casing and the cement column about the casing. Electrical logging is prohibited because the metallic properties of the casing act as a shield on the electrical formation properties which could be measured. Acoustic logging behind casing has been attempted but has generally been unsuccessful, primarily because of the large amount of acoustic energy absorbed by the casing. Again as in the electrical measurement case, this masks or obscures the acoustic characteristics of the earth formations behind the casing.

Nuclear well logging techniques, while generally usable in a cased borehole, have frequently encountered difficulty in distinguishing fresh water from oil. Some nuclear well logging techniques require that the salinity of the formation waters be relatively high (greater than about 40,000 parts per million sodium chloride) in order to detect water and distinguish it from oil in the pores of earth formations. Other nuclear logging techniques generally require complex and delicate downhole equipment. In addition to these shortcomings, most nuclear well logging instruments present at least some form of radiation hazard to personnel and must be handled with care in order to prevent the undesirable leakage of radioactive materials.

Thermal well logging has heretofore been conducted primarily in the form of simple temperature measurements taken in a borehole. It has been known in the past, for example, to measure the temperature at various depths in a borehole using a tool having either one or two high resolution thermometers in order to measure the geothermal temperature gradient. Logs of the temperature alone or of the temperature gradient have been produced. Anomalies such as a sudden slope change in the geothermal temperature gradient have been used to detect leaks in casing or production tubing or to locate fluid flow behind the casing in a cased well bore. These thermal measurements have also been utilized to locate fluid entries into the well bore or to define the lowest depth of production or liquid injection in a well. In addition to the above uses these techniques have also been utilized to locate the cement top in a cased well bore.

In the prior art temperature logging techniques, no source of heat has been utilized in the well bore to provide a constant heat flow from a well logging tool into earth formations. In the present invention the use of a constant output heat source enables earth formation characteristics to be measured in either open or cased well bores. Properties which may be measured include the thermal conductivity of earth formations and the specific heat of earth formations. Moreover, all of the prior art techniques which have been derived from simple temperature measurements in the borehole may also be utilized in the technique of the present invention as the ambient temperature measurements are readily available. The present invention provides a method of detecting the difference between fresh water (or salt water) and hydrocarbons in cased well bores. This provides a basis for determining whether a given earth formation contains fresh water, salt water, or hydrocarbons in the pore spaces therein.

Accordingly, it is an object of the present invention to provide methods for measuring the ratio of the thermal conductivity to the square of the specific heat of earth formations surrounding a well borehole.

It is a further object of the present invention to provide a means for determining whether the fluid content of earth formations in a cased borehole is fresh water, salt water, or hydrocarbon.

It is a further object of the present invention to provide a non-hazardous well logging technique for distinguishing fresh water filled earth formations from hydrocarbon filled earth formations which is substantially independent of formation lithology and borehole effects.

The above and other objects, features and advantages of the present invention are provided by methods for thermal borehole logging which includes a constant output heat source and plural thermal detectors. A well logging tool containing a heat source and plural temperature detectors is moved vertically through a borehole. A first temperature detector detects the ambient borehole temperature at each depth level. Two spatially separated detectors then determine the effect on the temperature of earth formations surrounding the borehole caused by the heat source contained in the tool. The temperature measurements made by the three detectors may then be appropriately combined to provide plots, graphs or logs indicative of the borehole temperature, the earth formation ratio of thermal conductivity to square of specific heat and the earth formation specific heat for formations in the vicinity of the borehole. In another embodiment of the invention a thermal drilling tool or heat drilling tip is utilized for oil well excavation. Plural temperature detectors spaced longitudinally from the thermal drilling tip monitor the borehole temperature at three different spatial locations removed from the vicinity thermal drilling tip or heat source. This provides, while drilling, a log of the borehole temperature, ratio of thermal conductivity, to square of specific heat, and specific heat as a function of depth when the measurements from these temperature detectors are appropriately combined.

The present invention is described with particularity in the appended claims. The invention is best understood when the following detailed description thereof is taken in conjunction with the associated drawings in which:

DESCRIPTION OF THE PREFERRED EMBODIMENTS

Two physically measurable quantities in both cased and uncased boreholes are the specific heat (C) and thermal conductivity (K) of the formation matrix and fluid. These parameters constitute the basis of the logging techniques of the present invention. In a borehole environment the rise in temperature ($\Delta T$), is related to the radiated energy (Q) from a heat source, the heated earth formation (M) and its composite specific heat (C) as given by the relationship of equation (1):

$$Q = C \cdot M \cdot \Delta T \qquad (1)$$

If a well logging tool having a constant output heat source is moved past an earth formation in a borehole, the rise in temperature thus would be inversely proportional to the specific heat of the borehole and formation surrounding the borehole at a particular depth level. In Table I the specific heats (C) for commonly encountered borehole materials are listed.

TABLE I

| MATERIAL | SPECIFIC HEAT (C) | MATERIAL | SPECIFIC HEAT (C) |
|---|---|---|---|
| Cement | 0.20 Cal/gm°C | Fresh Water | 1.00 |
| Chalk | 0.21 | Salt Water (50 NaCl) | 0.93 |
| Clay (Dry) | 0.22 | Petroleum | 0.51 |
| Granite | 0.19 | M-Octane | 0.58 |
| Marble | 0.21 | Methane (Gas) | 0.59 |
| Quartz | 0.19 | | |

The values given in Table I are for the range of temperatures from 20° to 100°C. It will be noticed by observing the data of Table I that all of the formation matrix materials have approximately the same specific heat (i.e., about 0.20 Cal/gm°C). Secondly, there is a strong difference (i.e., a factor of 2) between the specific heat of petroleum and water. Thirdly, specific heat is not a strong function of water salinity (typically variations on the order of 10% or less).

Accordingly, if it is possible to measure the relative specific heat of earth formations surrounding a well borehole, this information can be useful when combined with other logs in determining the fresh water (or salt water) zones and differentiating these zones from petroleum containing zones. This has long been a problem in the logging of cased boreholes due to the relatively similar response of fresh water and petroleum to conventional neutron lifetime or thermal neutron decay time well logging techniques.

Figure 1:
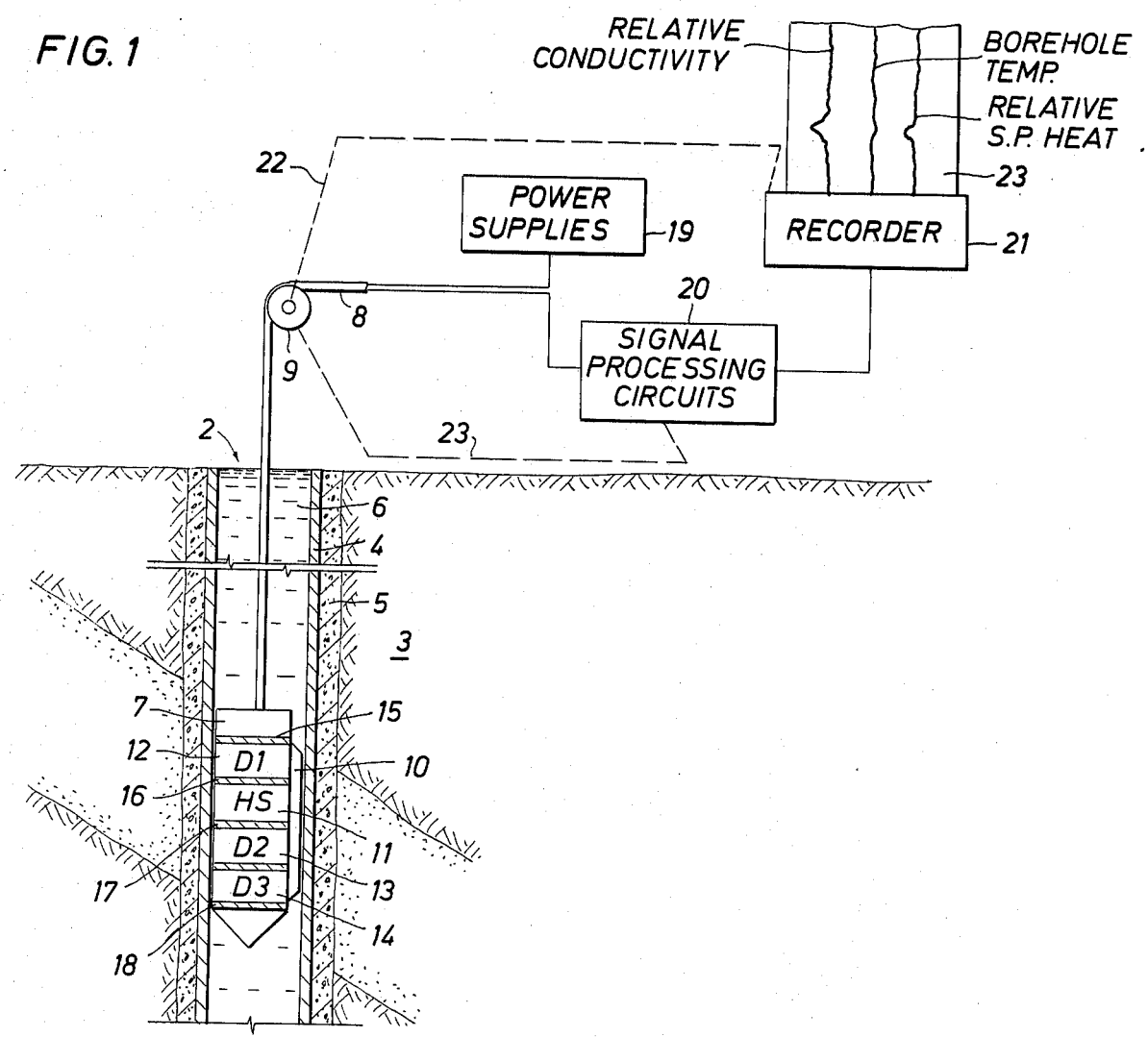
FIG. 1 is a schematic diagram showing the method of the present invention being utilized in borehole logging of a cased well bore.

Referring now to FIG. 1, apparatus is illustrated schematically for performing a temperature log, a specific heat log and a thermal conductivity log of earth formations surrounding a well borehole. A borehole 2 penetrating earth formations 3 is lined with a steel casing 4 which is cemented in place by a cement layer 5. Borehole fluid 6 fills the borehole. A fluid tight well logging sonde 7 is suspended via a well logging cable 8 which passes over a sheave wheel 9 in the borehole 2. The logging sonde 7 is eccentered in the borehole and urged against a side wall of the casing 4 by a wall engaging pad member 10 of conventional design as known in the art.

The well logging sonde 7 contains a heat source 11 and a plurality of heat sensitive transducers 12, 13, and 14, each of which is capable of measuring the temperature in its vicinity. The heat source 11 and the temperature sensitive transducers are separated from each other by plural insulating layers 15, 16, 17 and 18 in the well logging sonde 7. The body of the fluid tight sonde 7 is also preferably constructed of a thermally insulating material to prevent heat passage therethrough.

The heat sensitive transducers 12, 13, and 14 may comprise thermally sensitive resistors or thermistors which are connected as one leg of a balanced bridge circuit if desired. This technique is well known in the art for accurate measurement of borehole temperature. Other known temperature sensitive transducers may be utilized for this purpose. Such an alternative transducer could comprise a high frequency oscillator whose frequency is determined by a resistive element which is temperature sensitive. Alternatively, thermocouple type heat sensitive transducers may be used if desired.

It will be appreciated by those skilled in the art that the downhole sonde 7 also contains appropriate power supply circuitry and data transmission circuitry (not shown) for operating the heat source 11 and temperature sensitive transducers 12, 13 and 14 and for transmitting measurements made thereby to the surface on conductors of the well logging cable 8 for further processing. Any of a number of known data transmission and power transmission systems used in well logging may be utilized for this purpose in the present invention. The electrical power to operate the downhole sonde is supplied by a surface power source 19. Signals from the downhole instrumentation are supplied to signal processing circuits 20 whose function will be subsequently described in more detail and a well log of the relative conductivity, relative specific heat and borehole temperatures are provided from the signal processing circuits to a recorder 21. Recorder 21 is driven by an electrical or mechanical linkage with the sheave wheel 9 (as indicated by the dotted line 22) as a function of the borehole depth. The record medium 23 for plotting these logs is moved as a function of borehole depth. The sheave wheel 9 may also be mechanically or electrically connected to the signal processing circuits 20 in order that depth information may be utilized for computing the relative formation conductivity and specific heat in the manner to be described. This is indicated by the dotted line 23 in FIG. 1.

Power from the surface power supplies 19 is supplied to the downhole circuitry and to a heat source 11 in the downhole sonde. The heat source 11 may comprise a heater coil or other electrical heater apparatus which supplies a constant rate of heat output. Thus, as the sonde 7 is moved vertically past earth formations 3 at a constant speed a given or known amount of heat Q is generated from the heat source 11 and is supplied to the formations primarily by conduction and convection.

As a given amount of heat is applied from the downhole sonde 7 to the earth formations 3 surrounding the borehole 2, the rise in temperature induced at each depth can enable oil or gas bearing strata to be determined from water bearing strata in the following manner. It will be recalled from Table I that changes in water salinity and formation matrix are negligible on the specific heat of the earth formations in the vicinity of a borehole relative to changes in hydrocarbon content. Borehole effects, although not negligible, should be relatively constant, providing there is no change in casing, borehole fluid, or annular cementation. Therefore, different temperature changes in various depth zones when supplied with a constant amount of heat as provided by the sonde 7 can be attributed to differences in the hydrocarbon content in the pore spaces of those various zones. Smaller temperature changes will occur in water bearing zones than in those containing hydrocarbon. For example, in the idealized case of a 100 percent porosity formation saturated in the first case with water and in the second case with hydrocarbon and for a constant output heat source such as that in the sonde 7 the temperature change ΔT in the water saturated formation is given by:

$$\Delta T_{Water} = \frac{Q}{M_{Water} C_{Water}} = \frac{Q}{M_{Water}} \qquad (2)$$

where $M_{water}$ is the mass of the heated material and $C_{water}$ is the specific heat of the water saturated formation. Similarly, the temperature change caused by supplying the same amount of heat Q to an oil saturated formation is given by:

$$\Delta T_{Oil} = \frac{Q}{M_{Oil} C_{Oil}} = \frac{Q}{0.51 \, M_{Oil}} \qquad (3)$$

where $M_{Oil}$ is the mass of the heated material and $C_{Oil}$ is the specific heat of the oil saturated formation. Taking the ratio of these two equations and assuming that the same volume amount of water and oil are heated in the same period of time by the constant amount of heat output Q from the sonde 7 it will be seen that $$\frac{\Delta T_{Oil}}{\Delta T_{Water}} = \frac{M_{Water}}{M_{Oil}} \cdot \frac{(1.00)}{0.51} = \frac{P_{Water}}{P_{Oil}} \cdot \frac{(1.00)}{0.51}$$

$$= \frac{(1.00)}{0.90} \cdot \frac{(1.00)}{0.51} = 2.2 \qquad (4)$$

where $P_{Water}$ and $P_{Oil}$ are the densities of water and oil. It may thus be seen from equation 4 that in this idealized case the temperature change from the ambient temperature condition will be approximately 2.2 times greater for a pure oil bearing formation of 100 percent porosity than will be the case for a pure fresh water bearing formation in the same porosity. Of course it will be appreciated by those skilled in the art that this idealized case is not generally encountered in a borehole environment. However, it is representative of the type of measurement which may be expected using the methods of the present invention.

In making the measurement of the temperature change from the ambient condition to that caused by the application of constant heat source 11, the temperature at each borehole depth from the upper or ambient temperature sensor 12 of FIG. 1 must be stored in a memory device at the surface until the heat source 11 has passed this depth point and the second temperature sensor or detector 13 has reached the same depth level. When this occurs, the ratio of the temperatures caused by the constant output heat source 11 is detected. If the formation density at this depth is known, as for example by a gamma-gamma density log, the specific heat of the formation relative to the specific heat of water may be computed from equation 4. This computation may be performed in the surface signal processing circuits 20 of FIG. 1. Such circuits can comprise a small general purpose digital computer programmed to perform the computations of equation (4).

The thermal well logging tool of FIG. 1 may also be used to measure the ratio of the thermal conductivity (K) of various formations to the square of their specific heat C. From this measurement of $K/C^2$, then, the thermal conductivity can be derived if the specific heat is known from a previous (or simultaneous) measurement as previously described. The thermal conductivity, K, is proportional to the time rate of heat transfer in the formation. The one dimensional relationship governing the energy (ΔQ) transfer during a short time (Δt) in a formation having a temperature differential (ΔT) over a length (ΔX) is given by:

$$\frac{\Delta Q}{\Delta t} = \alpha \frac{\Delta T}{K \, \Delta X} \qquad (5)$$

where α is a constant dependent on the geometry of the borehole formation and well logging tool and K is the thermal conductivity.

If it is assumed that two formations, A and B, are at an initial temperature $T_0$ and have specific heats $C_A$ and $C_B$, then if an amount of heat, Q, is supplied to these formations their temperatures may be expressed as $$T_A \approx T_0 + (C_A M_A)^{-1} Q$$
$$T_B \approx T_0 + (C_B M_B)^{-1} Q \qquad (6)$$

where again $M_A$ and $M_B$ are the masses of the heated regions. When the heat source is removed from these formations the temperature of the heated portions will begin to decay back toward the ambient or steady state temperature according to equation 5. This produces equations 7 and 8.

$$\frac{\Delta Q_A}{\Delta t} \approx \frac{K_A [T_0 + (C_A M_A)^{-1}(Q) - T_0]}{X_A} \qquad (7)$$

$$\frac{\Delta Q_B}{\Delta t} \approx \frac{K_B [T_0 + (C_B M_B)^{-1}(Q) - T_0]}{X_B} \qquad (8)$$

However, if we make use of the differential form of equation (1):

$$\Delta Q_A \approx C_A M_A \Delta T_A \qquad (9)$$
$$\Delta Q_B \approx C_B M_B \Delta T_B,$$

then the change in temperature in a time interval Δt is given by the expression of equation 10:

$$\Delta T_A \approx \frac{\alpha K_A (C_A M_A)^{-1}(Q)}{\Delta X_A} \cdot \frac{1}{C_A M_A} \Delta t$$

$$\approx \alpha K_A \frac{Q \cdot \Delta t}{\Delta X_A (C_A M_A)^2} \qquad (10)$$

for formation A. In a similar manner, the expression for the change in temperature in a time interval Δt for formation B is given by equation 11.

$$\Delta T_B \approx \alpha K_B \frac{Q \cdot \Delta t}{\Delta X_B (C_B M_B)^2} \qquad (11)$$

Hence: $\Delta T_A \sim K_A / C_A^2 \qquad (12)$
and $\Delta T_B \sim K_B / C_B^2 \qquad (13)$
using expressions 12 and 13, then the relative temperature change in the two formations in this example (assuming similar masses $M_A$ and $M_B$ are heated) may be expressed by equation 14:

$$\Delta T_A \approx \frac{K_A C_B^2}{K_B C_A^2} \Delta T_B \qquad (14)$$

In other words, if two similarly heated earth formations in the vicinity of a borehole have different thermal conductivities $K_A$ and $K_B$ and a similar amount of heat is applied to these formations they will cool off at different rates which are a function of the thermal conductivities $K_A$ and $K_B$ and their specific heats $C_A$ and $C_B$. If the specific heats $C_A$ and $C_B$ are known from previous measurements such as those just described, then the thermal conductivity K may be computed and logged directly. Table II which follows gives the thermal conductivities K of several common borehole constituents.

TABLE II

| MATERIAL | POROSITY | MEASURED (K) THERMAL CONDUCTIVITY | CALCULATED THERMAL CONDUCTIVITY |
|---|---|---|---|
| Fresh Water Saturated Sand | 34 | 1.775 BTU/Ft · °F · Hr | 2.01 |
| Oil Saturated Sand | 34 | 0.950 | 1.16 |
| Air (Gas) Saturated Sand | 34 | 0.322 | 0.64 |
| Fresh Water Saturated Lime | 19 | 2.050 | 2.16 |
| Oil Saturated Lime | 19 | 1.245 | 1.31 |
| Air (Gas) Saturated Lime | 19 | 0.98 | 0.78 |

From Table II it may be seen that the same formation saturated with gas, oil and water has different overall thermal conductivities. Therefore, after being heated, fresh water formations may be distinguished on the basis of their different thermal decay rate from oil and gas saturated formations.

Referring again to FIG. 1, if the well logging tool 7 is moved vertically past the earth formations 3 the thermal conductivity may be measured in the following manner at a given depth level. If the well logging tool 7 is moved at a constant rate of speed past a particular earth formation depth level, then the temperature of the earth formation as temperature sensor 13 passes may be stored for a particular depth level and the temperature of the same earth formation a short time later when temperature sensor 14 passes it may also be measured. Then the ratio of the relative thermal conductivity ($K/C^2$) to its specific heat C at a particular depth level of earth formation will be indicated from equation (14) by noting the temperature change in the time interval $\Delta t$ as the well logging tool has moved past this earth formation. This assumes that a constant amount of heat as supplied by heat source 11 is applied to the earth formation and assumes that the geometrical constant $\alpha$ is the same for earth formations surrounding the well bore over a given depth interval. Once the ratio $K/C^2$ is known, then the known value of the specific heat C, for the formation may be used to extract the formation thermal conductivity K directly. Again, as with respect to the specific heat measurements, this computation is performed in the signal processing circuits or computer 20 of FIG. 1. The resultant log (which is proportional to thermal conductivity) is plotted as a function of borehole depth by the recorder 21 on the record medium 23 of FIG. 1 which is moved as a function of borehole depth.

In this manner it is possible with the well logging tool of FIG. 1 to record the three curves shown which are indicative of relative conductivity, relative specific heat and borehole temperature as the well logging sonde 7 with the constant output heat source 11 is moved vertically through the borehole 2. It will be appreciated by those skilled in the art that corrections for the geothermal temperature gradient may be applied to the foregoing description of the computations for the relative specific heat and the relative thermal conductivity of the formations. This geothermal gradient effect is well known in the art and may be derived from the borehole temperature measurements taken by the ambient temperature sensor 12 of the logging sonde 7 and the signal processing circuits 20 can subtract this effect from the temperature measurements.

Figure 2:
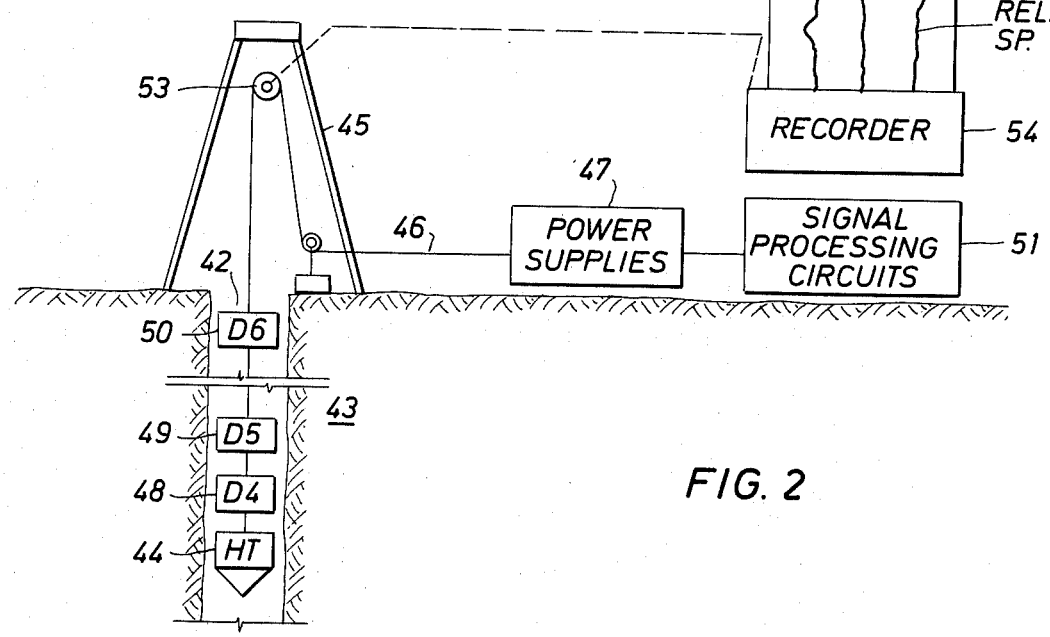
FIG. 2 is an embodiment of the present invention utilized in a thermal drilling operation for a borehole.

Referring now to FIG. 2, another embodiment of the present invention is shown in conjunction with borehole drilling apparatus. In the configuration of FIG. 2, a borehole 42 is being drilled in earth formations 43 by a thermal boring device 44 comprising a constant output heat source. Such a device is shown, for example, in the article in *NUCLEAR NEWS*, Volume 15, No. 2, February 1972, p. 47. A very high output heat drilling tip is used to virtually melt the earth formations thereby producing a borehole. The drilling rig is suspended from a derrick 45 via a wire line 46 which also serves to conduct electrical power from the surface power supply 47 to the thermal boring device 44. Cable 46 also serves to conduct signals from temperature sensors 48, 49 and 50 to the signal processing circuits 51 which are situated at the surface. Cable 46 passes over a sheave wheel 53 which may (in a manner similar to that of sheave wheel 9 of FIG. 1) be mechanically or electrically coupled to a recorder 54 for recording the output of signal processing circuits 51 as a function of borehole depth.

In the embodiment shown in FIG. 2, the ambient temperature detector 50 is situated a sufficient distance from the thermal drilling tip 44 to allow the formations to return to their ambient temperature after passage of the heat drilling tip 44 (possibly recorded in another pass through the borehole at a subsequent time). Temperature sensors 48 and 49 are analogous to temperature sensors 13 and 14 of FIG. 1 and are situated close enough to the heat drilling tip 44 to permit the specific heat and conductivity measurements to be made in the manner previously described with respect to FIG. 1. Signal processing circuits 51 may again comprise digital computer means which are programmed to perform the calculations for the relative specific heat and relative thermal conductivity based on the temperature measurements of the three sensors 48, 49 and 50 and previously described with respect to the corresponding temperature detectors 12, 13 and 14 of FIG. 1. Thus, measurements indicative of the borehole temperature, relative specific heat, and relative rates of thermal conductivity to specific heat during the drilling process, when utilizing the heat drilling tip 44, may be made. The log of these quantities recorded by the recorder 54 as a function of borehole depth. The foregoing descriptions may make other alternative embodiments of the invention apparent to those skilled in the art. It is the aim in the appended claims, therefore, to cover all such

I claim:

1. A method for thermal logging of a well borehole to provide a measure of the specific heat, the borehole ambient temperature, and the thermal conductivity of earth formations in the vicinity of the borehole comprising the steps of:

measuring the ambient temperature of earth formations in the vicinity of the borehole at a selected depth level;

heating the earth formations at said selected depth level by imparting a predetermined quantity of heat thereto;

measuring a first temperature of the earth formations at said selected depth level substantially simultaneously with said heating step and determining the temperature increase therein due to said heating step;

measuring, after a predetermined time interval, a second temperature of earth formations at said selected depth level and determining the temperature decrease therein due to thermal conductivity losses of heat to other surrounding formations;

combining said ambient temperature measurement and said first temperature measurement according to a first predetermined relationship and deriving an indication of the specific heat of earth formations at said selected depth level; and combining said first and second temerature measurements according to a second predetermined relationship and deriving an indication of the ratio of thermal conductivity to the square of the specific heat of earth formations at said selected depth level.

2. The method of claim 1 wherein the heating step is performed by applying heat from a relatively constant output heat source for a predetermined length of time.

3. The method of claim 1 wherein the steps are performed repetitively at a plurality of such selected depth levels and a log of the earth formation specific heat, ratio of thermal conductivity to square of specific heat and ambient temperature is recorded as a function of borehole depth.

4. The method of claim 1 and further including the step of combining said specific heat indication and said ratio of thermal conductivity to the square of specific heat indication of formation thermal conductivity and recording said indication of formation thermal conductivity as a function of borehole depth.

5. The method of claim 4 and further including the steps of recording simultaneously as a function of borehole depth said specific heat indication, said indication of formation thermal conductivity and the ambient temperature.

6. The method of claim 4 and further including the step of comparing said formation thermal conductivity indication with known values of such for water and oil saturated sands to derive an indication of the location of oil sands in a well borehole.

* * * * *